United States Patent
Bello et al.

(10) Patent No.: US 10,432,725 B2
(45) Date of Patent: *Oct. 1, 2019

(54) SERVER ACCESS PROCESSING SYSTEM

(71) Applicant: International Business Machines Corporation, Armonk, NY (US)

(72) Inventors: Adekunle Bello, Pflugerville, TX (US); Radhika Chirra, Cedar Park, TX (US); Nikhil Hegde, Round Rock, TX (US); Aruna Yedavilli, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,719

(22) Filed: Nov. 14, 2017

(65) Prior Publication Data

US 2018/0069927 A1  Mar. 8, 2018

Related U.S. Application Data

(63) Continuation of application No. 15/331,330, filed on Oct. 21, 2016, now Pat. No. 9,866,636, which is a
(Continued)

(51) Int. Cl.
*G06F 15/16* (2006.01)
*H04L 29/08* (2006.01)
(Continued)

(52) U.S. Cl.
CPC .......... *H04L 67/1097* (2013.01); *H04L 43/16* (2013.01); *H04L 47/193* (2013.01);
(Continued)

(58) Field of Classification Search
CPC .... H04L 69/16–16/169; H04L 12/5695; H04L 47/19–47/196; H04L 47/27; H04L 43/16; H04L 63/1458
See application file for complete search history.

(56) References Cited

U.S. PATENT DOCUMENTS 6,324,581 B1    11/2001  Xu et al.
6,779,033 B1 *  8/2004   Watson ................. H04L 29/06
                                                              709/227
(Continued)

OTHER PUBLICATIONS

Krasic et al., "Quality-Adaptive Media Streaming by Priority Drop"; 2003, pp. 112-121; ACM Press, NY, USA: www.cs.ubc.ca/~krasic/publications/krasic-nossdav03.pdf.
(Continued)

*Primary Examiner* — David Lazaro
*Assistant Examiner* — Julian Chang
(74) *Attorney, Agent, or Firm* — Cantor Colburn LLP; Joseph Petrokaitis

(57) ABSTRACT

A method, programmed medium and system are provided for preventing the denial of file system access to a plurality of clients accessing a NFS server. In one example, an NFS server is configured to listen on a server port. The server runs a separate daemon which "watches" client requests as they are received at the NFS server. The server processing system tracks the number of times a client sends consecutive TCP zero-window packets in response to a data packet from the server. If the number of zero-window packets crosses a user-defined threshold, then a routine is called to stop responding to that client using a backoff algorithm. When the server reaches a point where the number of available threads or any other relevant resource dips below a user-defined threshold, the server process starts terminating connections to the clients starting from the ones with the oldest entry in the table.

16 Claims, 4 Drawing Sheets

Related U.S. Application Data continuation of application No. 13/459,160, filed on Apr. 28, 2012, now Pat. No. 9,516,142, which is a continuation of application No. 12/614,511, filed on Nov. 9, 2009.

(51) Int. Cl.

| | | |
|---|---|---|
| *H04L 12/801* | (2013.01) | |
| *H04L 12/26* | (2006.01) | |
| *H04L 12/807* | (2013.01) | |
| *H04L 29/06* | (2006.01) | |
| *H04L 12/911* | (2013.01) | |

(52) U.S. Cl.
CPC ............ *H04L 47/27* (2013.01); *H04L 47/822* (2013.01); *H04L 63/1458* (2013.01); *H04L 67/143* (2013.01); *H04L 69/16* (2013.01); *H04L 69/163* (2013.01)

(56) References Cited

U.S. PATENT DOCUMENTS

| | | | |
|---|---|---|---|
| 6,965,942 B1 | 11/2005 | Young et al. | |
| 7,039,679 B2 | 5/2006 | Mendez et al. | |
| 7,277,963 B2 | 10/2007 | Dolson et al. | |
| 7,340,489 B2 | 3/2008 | Vishlitzky et al. | |
| 7,483,990 B2 | 1/2009 | Baratakke et al. | |
| 7,535,913 B2 | 5/2009 | Minami et al. | |
| 7,548,959 B2 | 6/2009 | Nakatani et al. | |
| 7,664,868 B2 | 2/2010 | Boucher et al. | |
| 7,730,196 B2 | 6/2010 | Hill et al. | |
| 7,797,565 B1* | 9/2010 | Tran | G06F 11/2028 709/223 |
| 8,593,954 B2* | 11/2013 | Zhuang | H04L 1/1867 370/230 |
| 2002/0055980 A1* | 5/2002 | Goddard | H04L 29/06 709/217 |
| 2002/0090003 A1* | 7/2002 | Melpignano | H04L 47/10 370/467 |
| 2003/0022628 A1* | 1/2003 | Mamiya | H04L 1/16 455/67.11 |
| 2003/0086395 A1* | 5/2003 | Shanbhag | H04W 36/02 370/331 |
| 2003/0086407 A1* | 5/2003 | Bhatt | H04L 1/0002 370/345 |
| 2003/0128672 A1* | 7/2003 | Komandur | H04L 1/1809 370/315 |
| 2004/0033806 A1* | 2/2004 | Daniel | H04W 72/085 455/450 |
| 2004/0064589 A1 | 4/2004 | Boucher et al. | |
| 2004/0103314 A1* | 5/2004 | Liston | H04L 63/1408 726/23 |
| 2004/0236802 A1* | 11/2004 | Baratakke | H04L 47/10 |
| 2006/0077976 A1* | 4/2006 | Park | G06F 3/1209 370/392 |
| 2006/0200575 A1* | 9/2006 | Sherer | H04L 12/1881 709/231 |
| 2006/0271680 A1* | 11/2006 | Shalev | H04L 69/16 709/225 |
| 2007/0050479 A1* | 3/2007 | Yoneda | H04L 65/604 709/219 |
| 2007/0086461 A1* | 4/2007 | Ward | H04L 45/04 370/392 |
| 2007/0214143 A1 | 9/2007 | Koarashi | |
| 2007/0245003 A1* | 10/2007 | Kashyap | H04L 67/14 709/223 |
| 2008/0037420 A1* | 2/2008 | Tang | H04L 1/1607 370/229 |
| 2008/0114889 A1* | 5/2008 | Deshpande | H04N 21/2343 709/231 |
| 2008/0114894 A1* | 5/2008 | Deshpande | H04L 65/608 709/237 |
| 2008/0195745 A1 | 8/2008 | Bowra et al. | |
| 2008/0228690 A1* | 9/2008 | Horovitz | H04L 69/16 706/48 |
| 2008/0229025 A1 | 9/2008 | Plamondon | |
| 2008/0281979 A1* | 11/2008 | Keeler | H04L 47/2475 709/233 |
| 2009/0196178 A1* | 8/2009 | Stewart | H04L 69/16 370/231 |
| 2009/0216909 A1 | 8/2009 | Schneider | |
| 2009/0240766 A1* | 9/2009 | Kikkawa | H04L 47/27 709/203 |
| 2009/0252047 A1* | 10/2009 | Coffey | G06F 11/0748 370/252 |
| 2010/0144363 A1 | 6/2010 | De Rosa et al. | |
| 2010/0211640 A1* | 8/2010 | Beverly, IV | H04L 51/12 709/206 |
| 2010/0211673 A1* | 8/2010 | Kosbab | H04L 41/5009 709/224 |
| 2010/0214919 A1* | 8/2010 | Kosbab | H04L 41/22 370/231 |
| 2011/0022804 A1 | 1/2011 | Vijayakumar et al. | |
| 2011/0113134 A1* | 5/2011 | Bello | H04L 63/1458 709/224 |
| 2011/0213890 A1 | 9/2011 | Ward et al. | |

OTHER PUBLICATIONS

Merwe et al., Abstract Only "Streaming Video Traffic: Characterization and Network Impact", Sep. 2002; https://www.researchgate.net/publication/228431510_Streaming_video_traffic_Character . . . ; 2 pgs.

Rejaie et al., "RAP: An End-to-end Rate-based Congestion Control Mechanism for Realtime Streams in the Internet", 1999; web.engr.oregonstate.edu/~thinhq/teaching/ece599/papers/rejaie_15.pdf; 9 pgs.

Yuen, Joe et al., Abstract Only "Adaptive Buffer Sensitive Scheduling for Transmitting Video Streams in a Mobile Multimedia System", RTAS, Seventh IEEE Real-Time Technology and Applications Symposium (RTAS'01) 2001; 2 pgs. https://www.researchgate.net/profile/Kam-Yiu_Lam/publication . . . .

* cited by examiner

SERVER ACCESS PROCESSING SYSTEM

DOMESTIC PRIORITY

This application is a Continuation of U.S. patent application Ser. No. 15/331,330 filed Oct. 21, 2016; which is a continuation of U.S. patent application Ser. No. 13/459,160, filed Apr. 28, 2012; which is a Continuation of U.S. patent application Ser. No. 12/614,511, filed Nov. 9, 2009, the contents of which are herein incorporated by reference in their entirety.

BACKGROUND

The present invention relates generally to information processing systems and more particularly to a methodology and implementation for enabling an improved processing system for accessing servers.

The Network File System (NFS) is one of the most prevalent forms of remote file systems in a distributed environment today. Typically an NFS server provides file system services to thousands of clients, typically running different operating systems. Since NFS configurations are star-based i.e., one server having multiple clients, one client overloading the server can cause serious degradation in file system access times for the other clients.

NFS is typically transmission control protocol (TCP) based, and uses sockets for server-client connection. NFS servers also have a limit on the number of concurrent threads that can service client requests. If one client is running an application that is unable to read from its end of the socket in a timely manner, the TCP stack on the client system might reach a point where it needs to send back TCP zero-window responses to the server. If this client has several requests to the server in this state, then the NFS server might not be able to service new client requests. The result of this is denial of file system access to the rest of the clients.

Thus, there is a need to provide a network server access processing system which is enabled to avoid the problems set forth above.

SUMMARY

A method, programmed medium and system are provided for preventing the denial of file system access to a plurality of clients accessing a NFS server. In one example, an NFS server is configured to listen on a designated server port. The server runs a separate daemon which "watches" client requests as they are received at the NFS server. In the example, the server processing system tracks the number of times a client sends consecutive TCP zero-window packets in response to a data packet from the server. This information is maintained, for example, in a table. The NFS server is enabled to do any one of several actions using the information, including, resetting the connection to the client with an appropriate response code. If the number of zero-window packets crosses a user-defined threshold, then a routine is called in the NFS server to stop responding to that client using a backoff algorithm. The algorithm causes the NFS server to NOT respond to the next request (blackout time) for the next N seconds. If more zero-window requests are received, the blackout time increases by predetermined amounts, for example, to 2*N, 4*N, 8*N and so on until a user-defined limit is reached. When the server reaches a point where the number of available threads or any other relevant resource dips below a user-defined threshold, the server access process is enabled to start terminating connections to the clients starting from the ones with the oldest entry in the table.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
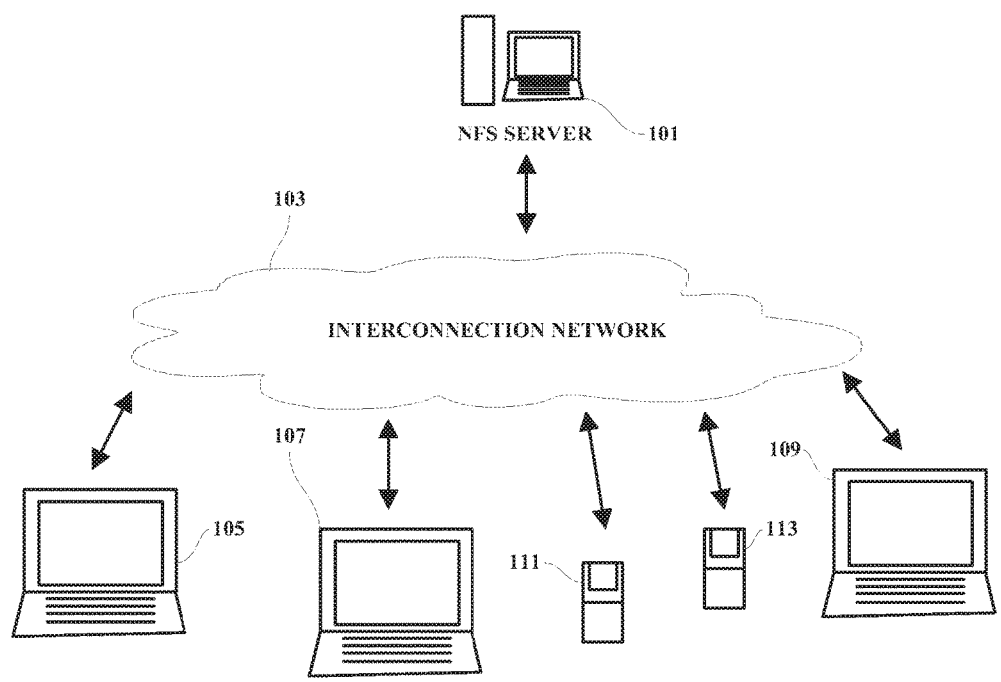
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system using a laptop computer or other portable device, it is understood that disclosed methodology may also be applied in many other available and future devices and systems such as cell phones and personal wireless and other hand-held devices, including any input device, including touch-sensitive screens or touch-sensitive input pads, to achieve the beneficial functional features described herein.

The present disclosure defines a method that will prevent the NFS server from denying access to a large number of clients due to a large number of concurrent requests from one or more clients that are not reading their data in a timely manner. The disclosed methodology is also applicable to a case where the client is running an application that is intentionally attempting to freeze NFS services by not reading from its end of the socket connections. The NFS server listens on a designated server port 2049. The server will run a separate daemon which will "watch" client requests as they are received at the NFS server. Specifically, the process will keep track of the number of times a client sends consecutive TCP zero window packets (ZWPs) in response to a data packet from the server. A ZWP is a flow control mechanism that a TCP client uses to inform the server that it is not quite ready to receive more packets as it is still processing the earlier packets. Thus, a ZWP is an indication, for example, that a client is having timing problems and as a result the client may tie-up server connection resources and make them unavailable to other clients who need to access the resources. The number of consecutive ZWPs will be counted, incremented and maintained, for example, in a table. The table is maintained by the process to keep a list of clients which have sent more than a predetermined number of consecutive TCP zero-window packets in the past. With this information, the NFS server can do any one of several possible actions. For example, the NFS server is enabled to selectively reset the connection to the client with an appropriate response code. If the number of zero-window packets crosses a user-defined threshold, then the daemon process is enabled to call a routine in the NFS server to stop responding to that client using a backoff algorithm. The algorithm will basically cause the NFS server to NOT respond to the next request (blackout time) for the next N seconds. If more zero-window requests are received, the blackout time increases by predetermined amounts, for example to 2*N, 4*N, 8*N and so on until a user-defined limit.

When the server reaches a point where the number of available threads or any other relevant resource dips below a user-defined threshold, the server process starts terminating connections to the clients starting from the ones with the oldest entry in the table. Using the disclosed methodology, NFS servers can continue to provide uninterrupted services even in the presence of a resource-starved client. Further, the table can be made accessible to the administrator, so he/she can have a statistical view of the load from each client and reallocate resources appropriately. The list of problem client machines could be exchanged between NFS servers to allow NFS servers to proactively take action against a hacker that has been identified in another portion of the network. When the exponential back off algorithm is used as a response to the alert from daemon, the advantage gained is that a client that temporarily slowed down is not penalized by cutting off communications abruptly FIG. 1 illustrates an exemplary environment in which the present invention may be implemented. As shown, an NFS server 101 may be accessed through an interconnection network 103, such as the Internet, by a plurality of client devices including computer terminals 105, 107 and 113 and other wireless devices 109 and 111. The client devices 105, 107 and 113 may be laptop computers and the wireless client devices 109 and 111 may be personal wireless communication devices.

Figure 2:
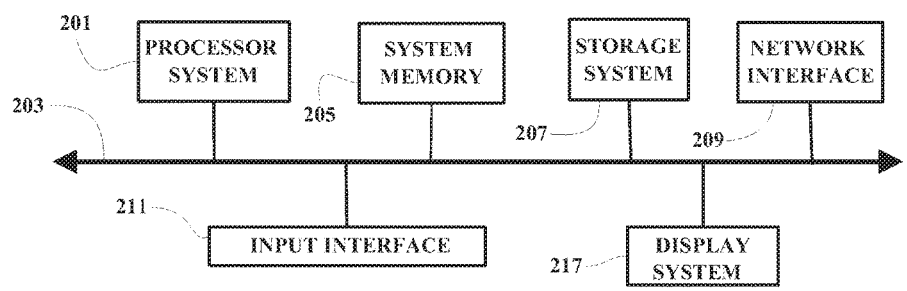
FIG. 2 is a block diagram showing several of the major components of an exemplary computer system or device using the present invention.

FIG. 2 illustrates several of the major components of a computer system which may be used to implement the present invention. As shown, a processor system 201 is connected to a main bus 203. The main bus 203 is also coupled to, inter alia, system memory 205, a local storage system 207, a network interface 209, and an input interface 211. The main bus is also connected to a display system 217. The input and/or display system may also comprise a touch-sensitive screen or optically-sensitive input pad (not shown). Additional devices and bus systems, which are not shown, may also be coupled to the system main bus 203.

Figure 3:
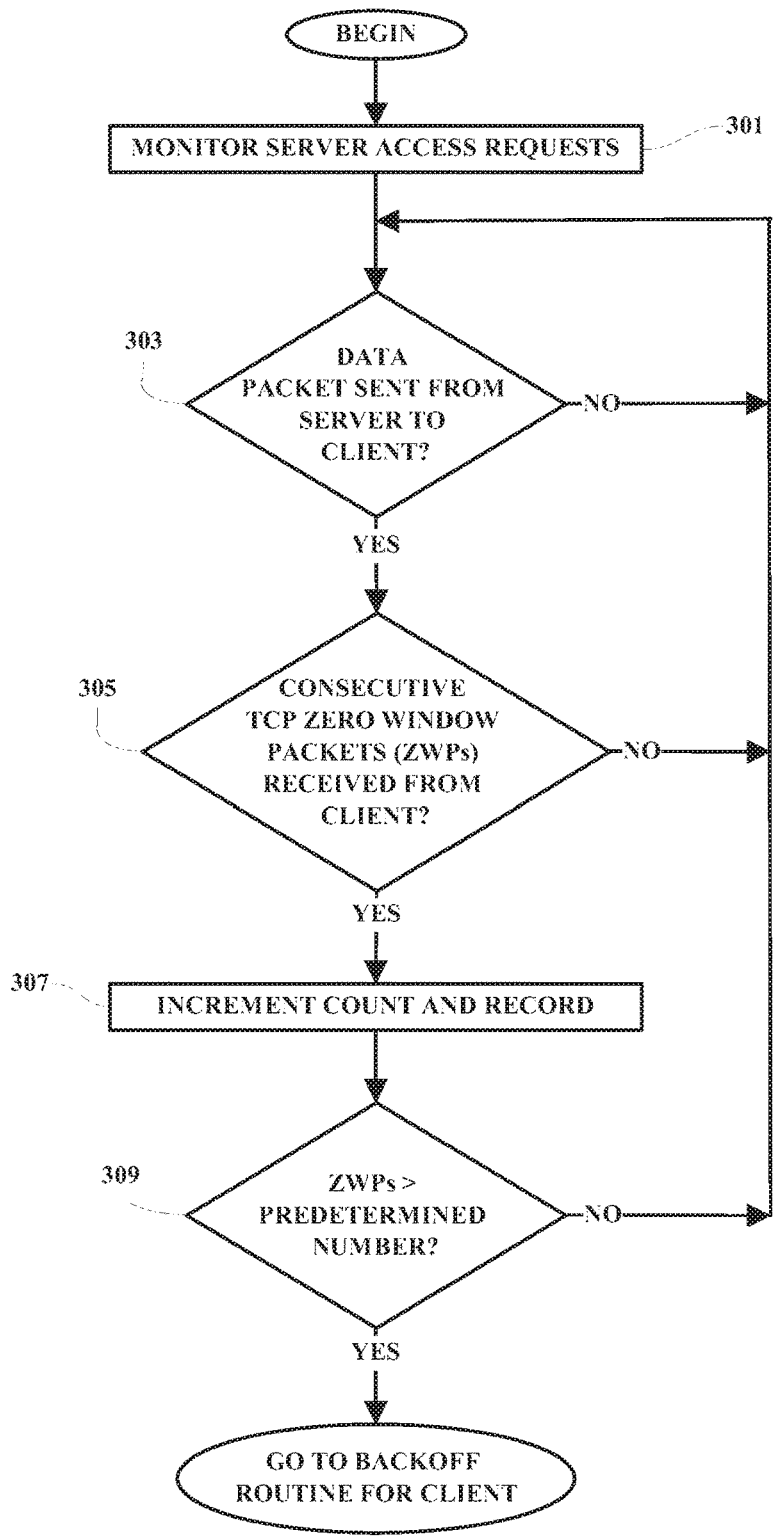
FIG. 3 is a flow chart illustrating an exemplary sequence of operations which may be implemented in accordance with the present invention.

In FIG. 3, there is shown a flow chart describing an exemplary operational sequence which may be implemented in code to accomplish the results described above. As shown, when the process is initiated, the server is enabled to monitor or "watch" 301 server access requests and traffic from remote computer system client devices such as computers 105 and 107 and/or personal communication devices 111 and 113, or other systems. After a data packet is sent from the server to a client device 303 in response to a client request, it is determined when a total number of consecutive TCP Zero Window Packets (ZWPs) are received from the client. When consecutive ZWPs are detected as having been received from the client 305, a total count is maintained 307 and may be kept in table form as discussed above. Whenever the number of consecutive ZWPs received exceeds a predetermined number 309, a backoff routine as illustrated in FIG. 4 is accessed.

Figure 4:
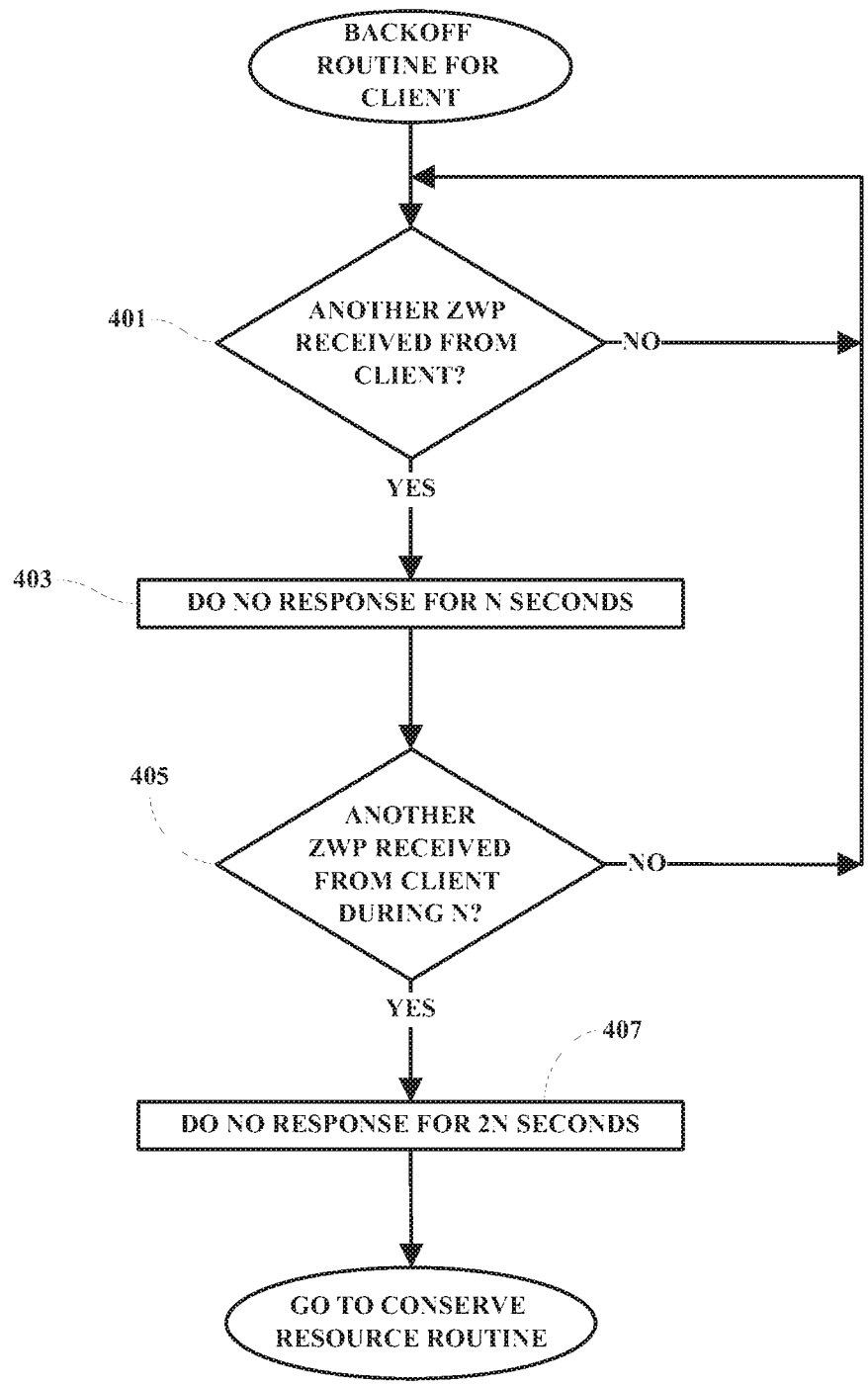
FIG. 4 is another flow chart illustrating an exemplary sequence of operations which may be implemented in accordance with the present invention.
Figure 5:
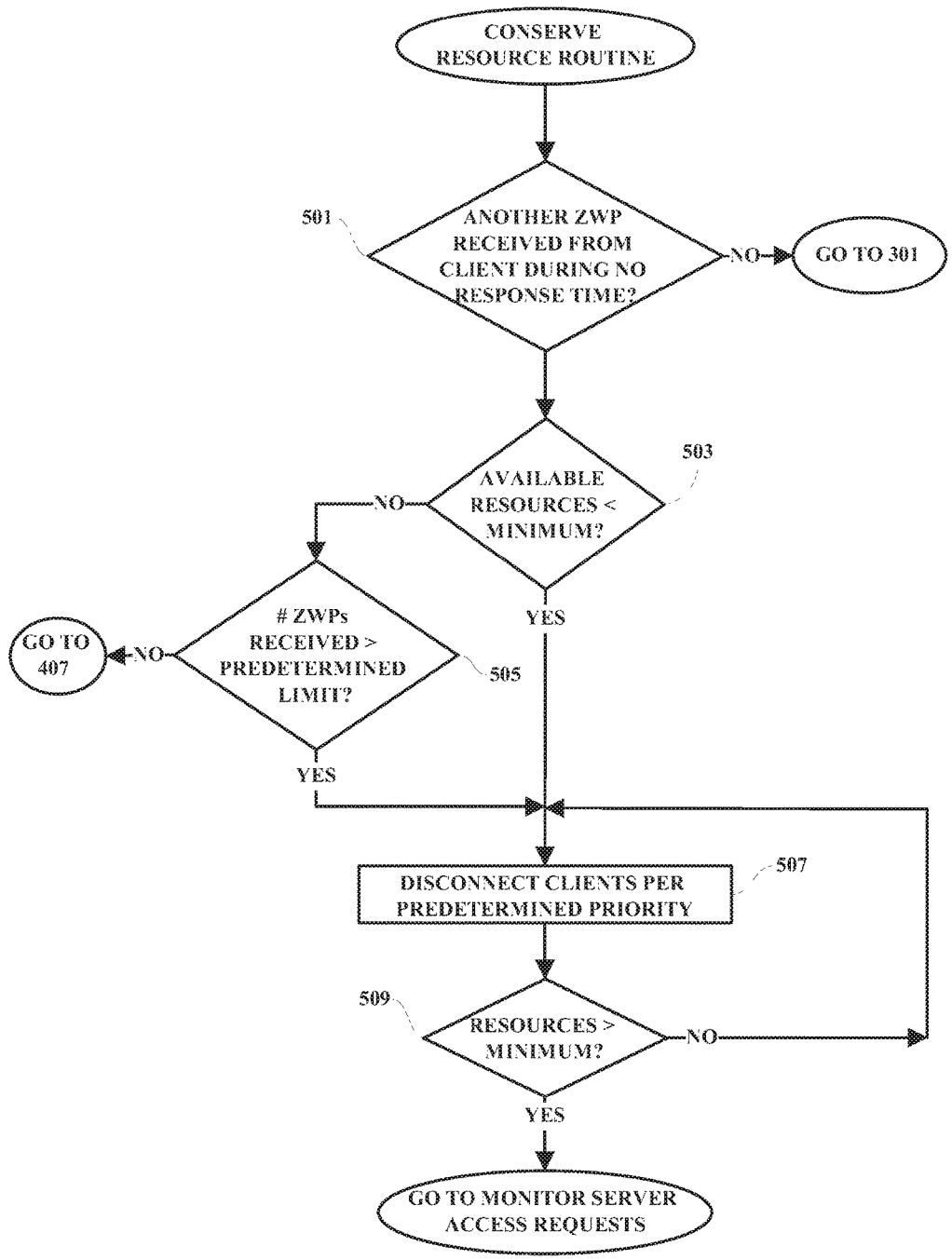
FIG. 5 is another flow chart illustrating an exemplary sequence of operations which may be implemented in accordance with the present invention.

As shown in FIG. 4, after having received the predetermined number of ZWPs from a client, the next ZWP received 401 will cause a first "no response" 403 or "wait" period "N" to begin during which no response is sent from the server. If during this time period another ZWP is received from the same client 405, then a second wait period is commenced 407. The second wait period is longer than the first wait period "N" and in the illustrated example, the second wait period is "2N" and the process goes to a resource conserve mode as shown in FIG. 5. It is noted here that a number of consecutive ZWPs received from a client is an indication that one client may, for example, be running an application that is unable to read from its end of the socket in a timely manner, and the TCP stack on the client system might reach a point where it needs to send back TCP zero-window responses to the server. If this client has several requests to the server in this state, then the NFS server might not be able to service new client requests with the result that there may be a denial of file system access to the rest of the clients. Thus, limits are set on the number of ZWPs returned to the server in order to detect and avoid this problem.

As shown in FIG. 5, in the conserve resource routine, if a ZWP is not received during the second wait period 501, this is an indication that the client machine is again processing in a timely manner and the server process returns to monitor subsequent server access requests 301. However, when another ZWP is received 501, for example, during the second wait period, the process determines if available server resources are less than a predetermined minimum 503, and if so, clients are disconnected from the server on a predetermined priority basis 507 such as disconnecting the oldest connection first, then checking on the resource availability and if necessary, disconnecting others in order until the resource availability returns to a satisfactory level and is greater than a minimum level 509. When the resource level returns to a predetermined minimum level 509 the process returns to monitor subsequent server access requests 301. If available server resources are not below a minimal level 503, then a check is made to determine if the number of consecutive ZWPs received from the client is greater than a predetermined limit 505, and if so, the above-discussed disconnect process 507 is implemented. If the total number of consecutive ZWPs received from a client is not greater than a predetermined number 505, then the process returns to block 407 to set another wait time period to monitor and count subsequently received ZWPs from the client. It is noted that the termination of client connections can result either from receiving too many consecutive ZWPs from a client regardless of server resource level, or from receiving a lesser number of ZWPs when the server resource level is in a low condition, or a combination of both. Further, it is noted that there need not be two wait periods and that the disconnect process may be implemented in connection with only a single wait period if server resources need to be allocated in a more tightly controlled manner. Further, the predetermined times and/or levels of resource availability may be adjusted by the server to suit various situations and conditions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer program product for enabling server access processing in a Network File System (NFS) interconnection network including a server operable for transmitting data packets to a plurality of client devices connected to said server in response to data requests from said plurality of client devices to said server, the computer program product comprising computer readable program code stored on a non-transitory computer readable medium and configured such that when such program code is read by said server, the server is operable for:

receiving data requests by said server from said client devices;

said server being operable in response to said computer readable program code for running a daemon program in a background, said daemon program being operable for monitoring said data requests from said client devices to said server, said daemon program being operable for determining when a data packet is sent from said server to a client device in response to a data request from said client device;

said client device being operable for sending zero window packets (ZWPs) from said client device to said server after receiving said data packet;

said server being operable in response to said computer readable program code for receiving said ZWPs sent from said client device, said daemon program being operable for counting a number of ZWPs received from said client device, said daemon program being further operable to provide a ZWP count representative of said number of ZWPs received from said client device; and said daemon program being operable for using said ZWP count to control access to said server by said client device.

2. The program product as set forth in claim 1 wherein said ZWP count includes a total count of consecutive ZWPs received by said server.

3. The program product as set forth in claim 2 and further including:

disconnecting said client device from said server after said total count exceeds a first predetermined number.

4. The program product as set forth in claim 2 and further including:

determining a resource availability level of said server when said total count exceeds a first predetermined number; and disconnecting said client device from said server when said resource availability level is below a predetermined level and said total count exceeds a first predetermined number.

5. The program product as set forth in claim 2 and further including:

disabling said server from responding to said client device for a first time period after said total count exceeds a first predetermined number.

6. The program product as set forth in claim 5 and further including enabling said server to respond to said client device after said first time period if no ZWPs are received by said server from said client device during said first time period.

7. The program product as set forth in claim 5 and further including:

disabling said server from responding to said client device for a second time period after said total count exceeds a second predetermined number at a completion of said first time period, said second time period being greater than said first time period.

8. The program product as set forth in claim 7 and further including enabling said server to respond to said client device after said second time period if no ZWPs are received by said server from said client device during said second time period.

9. In a Network File System (NFS), a server having a processor enabled to manage server access requests from a client device, said processor being operable for transmitting data packets to said client device in response to data requests from said client device to said server, said server comprising:

receiving data requests by said server from said client device;

said server being operable for running a daemon program in a background, said daemon program being operable for monitoring said data requests from said client device to said server, said daemon program being operable for determining when a data packet is sent from said server to said client device in response to a data request from said client device;

said client device being operable for sending zero window packets (ZWPs) from said client device to said server after receiving said data packet;

said server being operable for receiving said ZWPs sent from said client device, said daemon program being operable for counting a number of ZWPs received from said client device, said daemon program being further operable to provide a ZWP count representative of said number of ZWPs received from said client device; and said daemon program being operable for using said ZWP count to control access to said server by said client device.

10. The server as set forth in claim 9 wherein said ZWP count includes a total count of consecutive ZWPs received by said server.

11. The server as set forth in claim 10 and further including:
means for disconnecting said client device from said server after said total count exceeds a first predetermined number.

12. The server as set forth in claim 10 and further including:
means for disabling said server from responding to said client device for a first time period after said total count exceeds a first predetermined number.

13. The server as set forth in claim 12 and further including means for enabling said server to respond to said client device after said first time period if no ZWPs are received by said server from said client device during first time period.

14. The server as set forth in claim 12 and further including:
means for disabling said server from responding to said client device for a second time period after said total count exceeds a second predetermined number at a completion of said first time period, said second time period being greater than said first time period.

15. The server as set forth in claim 14 and further including means for enabling said server to respond to said client device after said second time period if no ZWPs are received by said server from said client device during said second time period.

16. A Network File System (NFS) including a server and at least one client device accessing said server, said server being operable for transmitting data packets to said client device in response to data requests from said client device to said server, said server being enabled for managing access to said server by said client device, said server including:

receiving data requests by said server from said client device;

said server being operable for running a daemon program in a background, said daemon program being operable for monitoring said data requests from said client device to said server on a designated port, said daemon program being operable for determining when a data packet is sent from said server to said client device in response to a data request from said client device;

said client device being operable for sending zero window packets (ZWPs) from said client device to said server after receiving said data packet;

said server being operable for receiving said ZWPs sent from said client device, said daemon program being operable for counting a number of ZWPs received from said client device, said daemon program being further operable to provide a ZWP count representative of said number of ZWPs received from said client device, said ZWP count including a total count of consecutive ZWPs received by said server;

means for enabling said server to respond to said client device after said first time period if no ZWPs are received by said server from said client device during said first time period;

means for disabling said server from responding to said client device for a second time period after said total count exceeds a second predetermined number at a completion of said first time period, said second time period being greater than said first time period;

means for enabling said server to respond to said client device after said second time period if no ZWPs are received by said server from said client device during said second time period; and means for disconnecting said client device from said server when a resource availability level is below a predetermined level and said total count exceeds said second predetermined number after said second time period.

* * * * *